United States Patent [19]
Fenster et al.

[11] Patent Number: 4,912,562
[45] Date of Patent: Mar. 27, 1990

[54] METHOD OF AND MEANS FOR PRINTING A MULTILEVEL REPRESENTATION OF AN IMAGE

[75] Inventors: Paul Fenster, Petach Tikva; Yoav Ben-Dror, Rehovot, both of Israel

[73] Assignee: Spectrum Sciences B.V., Rotterdam, Netherlands

[21] Appl. No.: 319,125

[22] Filed: Mar. 6, 1989

[51] Int. Cl.[4] .................... H04N 1/23; H04N 1/46
[52] U.S. Cl. ............................. 358/298; 358/457; 358/459; 358/460; 358/78
[58] Field of Search ............. 358/298, 75, 78, 455, 358/456, 459, 457, 460

[56] References Cited

U.S. PATENT DOCUMENTS

| | | | |
|---|---|---|---|
| 4,149,194 | 4/1979 | Holladay | 358/298 |
| 4,185,304 | 1/1980 | Holladay | 358/298 |
| 4,456,924 | 6/1984 | Rosenfeld | 358/75 |
| 4,499,489 | 2/1985 | Gall et al. | 358/75 |
| 4,700,235 | 10/1987 | Gall | 358/298 |

Primary Examiner—Teresa J. Walberg
Assistant Examiner—Scott A. Rogers
Attorney, Agent, or Firm—Sandler, Greenblum & Bernstein

[57] ABSTRACT

A half-tone reproduction of an object on a recording medium is produced using gray level values contained in the cells of an object matrix representative of the object. An actuatable marking device is operatively associated with and displaceable relative to the recording medium for printing a dot thereon at an exposure point determined by the location of the marking device at which the latter is actuated. A representation of the coordinates of the marking device is obtained, and converted to modular coordinates representative of the coordinates of the exposure point on a mesh of a fictitious of half-tone screen having a predetermined angular orientation relative to the print medium. A threshold screen value is computed from the modular coordinates, and a gray level value is obtained from the cell of the object matrix closest to the coordinates of the exposure point. The threshold value is compared to the obtained gray level value, and an actuating signal is produced depending upon the results of the comparison.

33 Claims, 4 Drawing Sheets

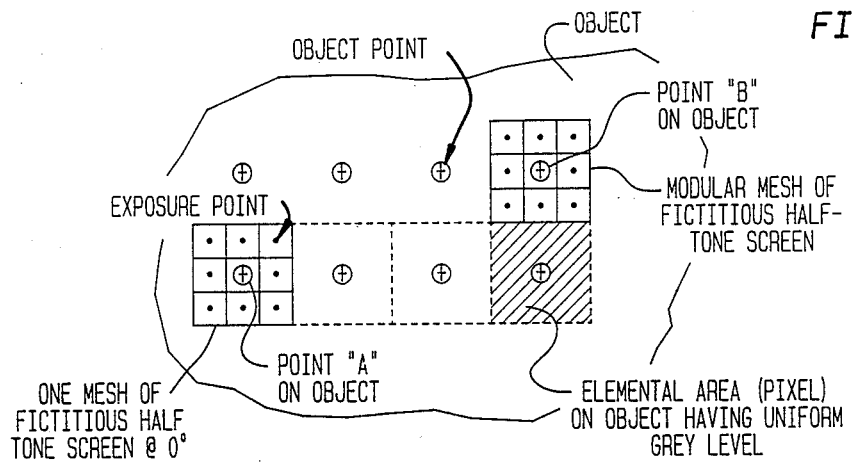
FIG. 1
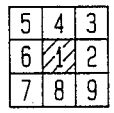 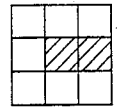 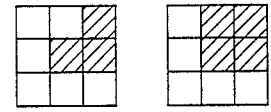 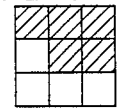
FIG.2A FIG.2B FIG.2C FIG.2D FIG.2E
 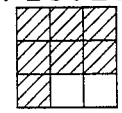 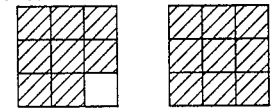
FIG.2F FIG.2G FIG.2H FIG.2I
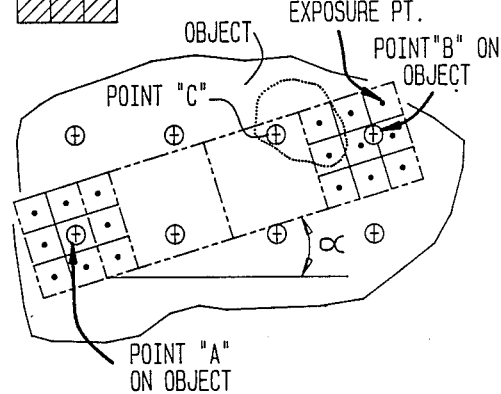
FIG. 4
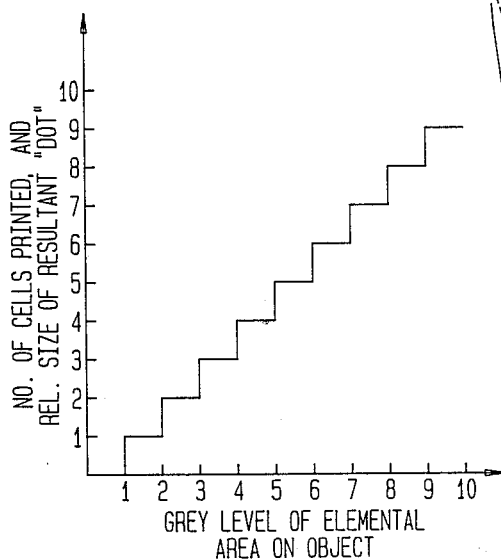
FIG. 3

— TYPICAL EQUAL VALUE LINE

— EQUAL VALUE LINE (CIRCLE-FLOOR)

— EQUAL VALUE LINE (CIRCLE-ROUND)

METHOD OF AND MEANS FOR PRINTING A MULTILEVEL REPRESENTATION OF AN IMAGE

DESCRIPTION

1. Technical Field

This invention relates to a method of and means for printing a multilevel representation of an image on a recording medium.

2. Background Art

A multilevel representation of an image or an object is constituted by a two-dimensional array of digital memory locations wherein each cell or address contains a number representing the brightness level of an elemental area of the object corresponding to the memory address. Such an array can be obtained by scanning the object with a sensor response to the intensity of light received by the sensor from each elemental area of the object, and storing a number representative of such intensity at the appropriate address in memory. The number stored at a given address is the ratio of the brightness of the elemental area of the object to the difference between the brightness elemental area and the dimmest elemental area of the object. Using this technique, an array may be obtained for each of the red, blue, and green color contents of elemental areas of the object, as well as for the brightness of the object independent of color. Alternatively, the arrays could be computer-generated and is thus not represent an actual object.

The contents of a given address in an array so obtained represents the gray level of an elemental area surrounding the point in the object established by the address. How closely the stored array matches the actual gray level distribution in the object is a function of the number of elemental areas per unit length, i.e., their size, as well as the number of levels between the brightest and dimmest pixels. Thus, an object represented by an array can be thought of as a two-dimensional array of elemental picture elements (pixels) each of which is uniformly bright over its entire area as suggested in FIG. 1 wherein the circled plus-signs represent the spatial coordinates of the object point at which the memory contains gray level information. Thus, point "A" is the center of a square whose size is equal to the pitch of the data points obtained during the scanning process. That is to say, if an object were scanned at a rate of 125 pixels per inch, then the physical size of the square in which data point "A" is located would be 0.008 inches. Within a square of this size on the object, the gray level of the representation of the object is constant. An adjacent point is also surrounded by a square of the same size whose gray level may be the same as or different from the gray level of point "A", but is uniform over the square.

In a technique for printing a multilevel representation of an image or an object, regularly spaced dots on a recording medium are produced, the size of a dot on the recording medium being directly related to the brightness level of the representation of the object at an image point thereon corresponding to the dot (using the convention that no color is 0, and maximum color equals the largest brightness value). That is to say, a dot produced by the printing apparatus at an image point with brightness level 4 would be twice the size of a dot for an image point with brightness level 2, etc. Thus, a continuous tone original may be printed as a plurality of discrete dots of uniform brightness, the size of a dot being related to the brightness level of the image point associated with the dot.

Where the object or image is represented by brightness levels in array form, the value of the array at the point nearest the position of the dot is used to determine the size of the dot. The repeat interval of the dots could be greater than, equal to, or less than the repeat interval of the array points.

Following the convention for color printing, a red color-separation array (obtained by using a red filter over the sensor) would be used to produce cyan (minus red) dots on the recording medium, a green color-separation array would be used to produce magenta (minus green) dots, a blue color-separation array would be used to produce yellow (minus-blue) dots, and a neutral density array would be used to produce black dots. The "dot" production can be either sequential or simultaneous depending upon the technique employed.

Relating the size of each dot on the recording medium to the gray levels stored in the array at the address associated with the dot is achieved by employing a technique that emulates the conventional technique by which an image of a continuous tone object is converted into a half-tone print by photographing the object through a half-tone screen onto a sheet of high contrast film. In the latter technique, the screen is in the form of a two-dimensional array of cells having different brightness level thresholds.

In a digital analogy to this method, mesh cells consist of an array of cells having different brightness level thresholds. For example, if each mesh has nine cells, then an image representation having ten gray levels (0 to 9) could be printed.

Reference is made in FIG. 2 which shows a single mesh having nine cells each having respective brightness level thresholds in the range 1–9 as indicated. For simplicity, the size of the mesh is the same as the size of a pixel in the object shown in FIG. 1, although as previously indicated, this size can be larger or smaller than the pixel size. If the level of a pixel were one (using the convention that no color is 0 and the maximum color is 9), then only one cell (i.e., the center cell shown in FIG. 2) would be activated. A marking device, sometimes hereinafter referred to as a printhead, is associated with the center cell and would be actuated to produce a dot in the form of a single marked or printed spot as indicated.

If the gray level were two, then only two cells would be activated. Printheads associated with the activated cells would be actuated so as to reproduce a printed spot for each of these cells. Thus, the number of cells that are activated is linearly related to the brightness of the elemental area of the image with which the mesh is associated. FIG. 3 shows this relationship. Because the printed spots coalesce into a dot, the area of such a dot associated with a given position on the image would be functionally related to the gray level of the dot.

For the case where the size of the dot is not exactly equal to the number of spots printed, the threshold levels of the cells would be adjusted to give a linear transformation of the brightness level to the printed area.

The above-described printing technique is applicable to electronic printing by utilizing a single matrix of memory cells that simulates a single mesh of a half tone screen, and relying on the modular repetition of a fictitious screen large enough to cover the object and comprising a two-dimensional array of meshes, to associate the single mesh with all of the data points in the object. The number of cells in the mesh matrix is based on the number of brightness levels required; for simplicity, nine cells arranged in a 3×3 matrix are assumed.

Each cell of the mesh matrix contains a different brightness level threshold value of the object matrix. For a 3×3 mesh matrix, the cells would contain a number in the range 1–9, with each number being different. Furthermore, each cell of the mesh matrix is associated with an individually controllable marking device, such as a printhead capable of marking a spot on a recording medium when the marking device is actuated. In this manner, each cell in the mesh matrix is associated with an exposure point on the recording medium.

As a consequence of the above-arrangement, a dot is printed by the printhead mechanism on the recording medium, the dot being in reality, a series of smaller spots produced by the various printheads such that the size of the resultant dot is functionally related to the gray level stored in the address in the object matrix. When the process is completed, a half-tone reproduction of a continuous tone object is obtained.

The process described above and the reproduced image of an object so obtained is directly analogous to a conventional half-tone photographic process using what is termed a zero-degree screen to produce a black-and-white half-tone reproduction of the object. If a color print of the object were desired, and color separation object matrices were available, the process as described above is also applicable by electronically rotating the fictional mesh at the appropriate angle. Conventionally, a printout in yellow (which requires a blue color-separation object (matrix) is obtained using a zero degree mesh matrix as described above. Superimposed on this print would be a cyan printout (which requires a red-color separation object matrix) using a 75° mesh matrix, a magenta printout (which requires a green-color separation object matrix) using a 15° mesh matrix, and a black-and-white printout (which requires a neutral-density object matrix) using a 45° mesh matrix.

In order to utilize a rotated mesh matrix, the modularity of the rotated fictitious screen over the object is utilized as indicated in FIG. 4 which shows a simulated screen rotated at alpha degrees about point "A" in the object matrix.

The exposure points in the rotated screen are not symmetrically placed relative to the object points, and a computation process is required to locate the nine exposure points of a mesh with respect to the object points. Knowing the absolute coordinates of each object matrix point and each exposure point, the coordinates of the appropriate cells of the mesh associated with the object matrix points and the exposure points can be calculated from the angle of rotation of the screen and the modulus associated with the coordinates of the mesh. Thus, the nine locations of the exposure points associated with point "B" in FIG. 3 can be computed knowing the angle alpha and the absolute x,y coordinates of point "B". The comparison step, by which the contents of the cell in the mesh matrix is compared with the cell in the object matrix, is carried out using the cell in the object matrix closest to the cell in the mesh matrix as determined by the computation process described above.

A computation is required to locate the appropriate cell point to be used to determine the brightness threshold level for each exposure point. Knowing the absolute x,y coordinates, the associated cell in the mesh can be computed using the angle of rotation of the screen as described in U.S. Pat. No. 4,456,924, or U.S. Pat. No. 4,499,489, each of which is hereby incorporated by reference. The comparison step is carried out using the closest pixel value and the brightness threshold value associated with the nearest point in the rotated mesh matrix.

Thus, in the example shown in FIG. 3, eight of the nine mesh matrix cells are closer to point "B" in FIG. 3 than any other point, while the remaining one of the nine cells are closer to point "C" than to point "B". The decision to print or not to print each of the eight of the nine exposure points depends upon individual comparisons of the contents of these eight cells with the contents of point "B". On the other hand, the decision to print or not to print the one remaining exposure point depends upon the result of a comparison of the contents of this cell and the mesh matrix with the contents of point "C" in the object matrix. In this manner, every point in the object matrix is utilized.

When the last described process is carried out for each color-separation image, the result is a color printout of the object in terms of cyan, magenta, yellow and black dots in a way that minimizes moire patterns in the colored reproduction. However, such process involves an interpolation process that may yield unsatisfactory results. Also, any charge in the relationship between the number of exposure points in the reproduced image per object point in the image matrix, requires a modification in the size and contents of mesh matrix. This may be inconvenient in certain circumstances; and it is an object of the present invention to provide a new and improved method of and means for printing a multilevel bit map representation of an object that overcomes or substantially ameliorates some of the problems with the prior art.

BRIEF DESCRIPTION OF THE INVENTION

According to the present invention, a method is provided for producing a half-tone reproduction of an object from an object matrix of gray level values representative of the object. Each cell of the object matrix is associated with an object point having object coordinates related to the object and containing a gray level value representative of the gray level of the object in an elemental area thereof surrounding the object point.

The method utilizes at least one printhead displaceable relative to a recording medium, the printhead being constructed and arranged to print a spot on the medium at an exposure point determined by the printhead coordinates in response to actuation of the printhead. The method includes the steps of establishing a relationship between the object coordinates and the printhead coordinates, and operatively positioning the printhead on the medium. The coordinates of the printhead relative to the medium is evaluated to establish an exposure point on the medium. The evaluated coordinates are converted to modular coordinates representative of the coordinates of the exposure point on a mesh of a fictitious half-tone screen associated with the object point. A threshold screen value is computed from the modular coordinates and a gray level value is obtained from the object matrix using the coordinates of the printhead. A comparison is made between the gray level value and the threshold screen value; and the printhead is actuated in accordance with the results of this comparison. The steps are repeated until the reproduction is completed.

Preferably, the computing step utilizes an analytical threshold screen value. In the preferred arrangement the threshold screen function is of the form u=(t) cos (kt), v=(t) sin (kt) where u and v are the modular coordinates of the exposure point, kt is the angle whose arc tangent is u/v, and t is the threshold screen value. The distance between exposure points is normalized to one, and the value of k is usually greater than $2\pi$, and preferably between $2.6\pi$ and $2.8\pi$, with $2.65\pi$ giving the best results.

BRIEF DESCRIPTION OF THE DRAWINGS

Embodiments of the present invention are shown in the accompanying drawings wherein:

FIG. 1 is a schematic representation of a continuous-tone object on which a plurality of object points are superimposed for the purpose of showing how an object is divided into a plurality of picture elements over each of which the gray level is constant, and for showing a fictitious half-tone screen superimposed on the object;

FIGS. 2a–i are representations of dots printed in accordance with the gray level of the elemental area of the object with which the exposure points are associated;

FIG. 3 is a graph that shows the relationship between the gray level of an elemental area on the object and the number of cells of a mesh of the screen which are printed;

FIG. 4 is a view similar to FIG. 1 in which the fictitious screen is shown rotated at an angle alpha degrees from the horizontal;

DETAILED DESCRIPTION

Figure 5:
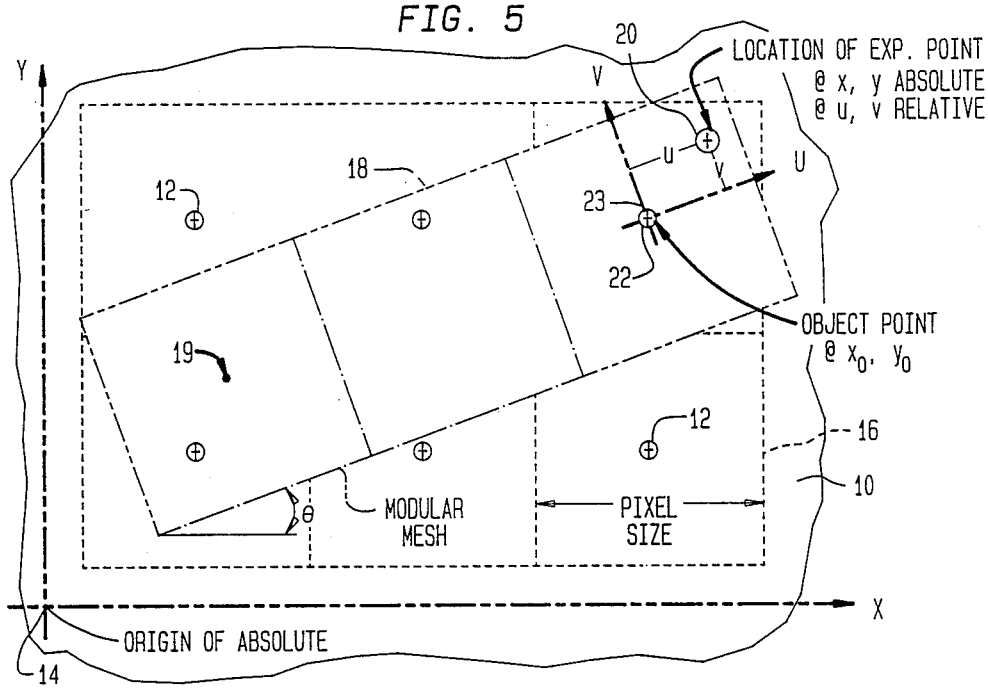
FIG. 5 is a schematic superposition of a fictitious modular mesh on an object showing the relationship between the coordinates of an exposure point and data points on the object.

Referring now to the drawings, and specifically FIG. 5, reference numeral 10 designates a portion of an object, such as a three-dimensional object, a photograph, etc., to be reproduced on a recording medium. Superimposed on object 10 are a plurality of object points 12 located with respect to origin 14 of an absolute coordinate system having axes X,Y. These object points do not actually exist on the object; but each is representative of locations on the object at which data are obtained in a conventional manner described below. Such data are representative of the gray-level of an elemental area surrounding an object point.

The object points are associated with an object matrix in a digital memory, the addresses of which bear a functional relationship to the origin of the absolute coordinate system. Each cell of the matrix contains a number representative of the gray level of the object in an elemental area 16 surrounding an object point. Thus, object 10 can be thought of as being composed of a plurality of pixels each of which has a uniform gray level associated therewith, the gray level, from pixel to pixel, being dependent upon the brightness distributed associated with the object.

FIG. 5 also shows modular mesh 18 associated with object points 12, the modular mesh being oriented at an angle $\theta$ with respect to the absolute coordinate axes X, Y. Modular mesh 18 is entirely fictional and is shown in FIG. 5 for the purpose of illustrating how a single mesh of an electronic half-tone screen is utilized for the electronic reproduction of object 10 on a recording medium.

Also shown in FIG. 5 is the location of exposure point 20 which is a point located on a recording medium (not shown) and defined by the physical location of a printhead (not shown) operatively positioned with respect to the recording medium. Depending upon whether the printhead is actuated, a spot will be printed or exposed on the recording medium at the coordinates of the printhead at exposure point 20. The cooperation between modular mesh 18 and the contents of the object matrix referred to above determines whether the printhead will be actuated.

As described below, the coordinates of exposure point 20 may be related by a scale factor to the coordinate system used in the object to determine the location of object points 12. Because of the modular nature of mesh 18, exposure point 20 will be associated with a particular mesh depending upon the absolute coordinates of the exposure point as shown in FIG. 5. A brief explanation of a suitable computation process is provided to complete the disclosure. The location of exposure point 20, the location of the origin 19 of a mesh on screen 18, and the location of object point 21, all with respect to origin 14 are established in a conventional manner. With this information, and having the pixel size and the angularity of rotation of the mesh, the location of origin 23 of the mesh associated with the coordinates of exposure point 20 can be calculated as described in the '924 and '489 patents incorporated by reference. With this information, the relative coordinates u, v of exposure point 20 can be computed based on local coordinates U,V.

As described in detail below, knowledge of the relative coordinates u, v of an exposure point in a mesh is used for the purpose of computing a threshold screen value. This threshold screen value is compared with the gray-level of the object point closest to exposure point 20. An actuating signal is produced depending upon the results of the comparison; and the actuating signal is applied to the printhead for selectively actuating the same. For example, if the contents of the object matrix corresponding to object point 22 is greater than the threshold screen value computed as indicated above, then an actuating signal is produced which causes the printhead to impact the recording medium and produce a spot as a consequence. The color of the spot depends on the color separation involved; and the angle used depends on the screen angle chosen for that color.

After the above-described comparison is made, and a spot is printed or not printed in accordance with the comparison, the printhead position is incremented and the process described above is repeated until the printhead has been located at all possible positions with respect to the recording medium as determined by the object, and printing on the recording medium is completed. Alternatively, a plurality of printing heads can be configured to simultaneously print spots, and a determination for each exposure point to print or not to print is made separately.

Figure 7:
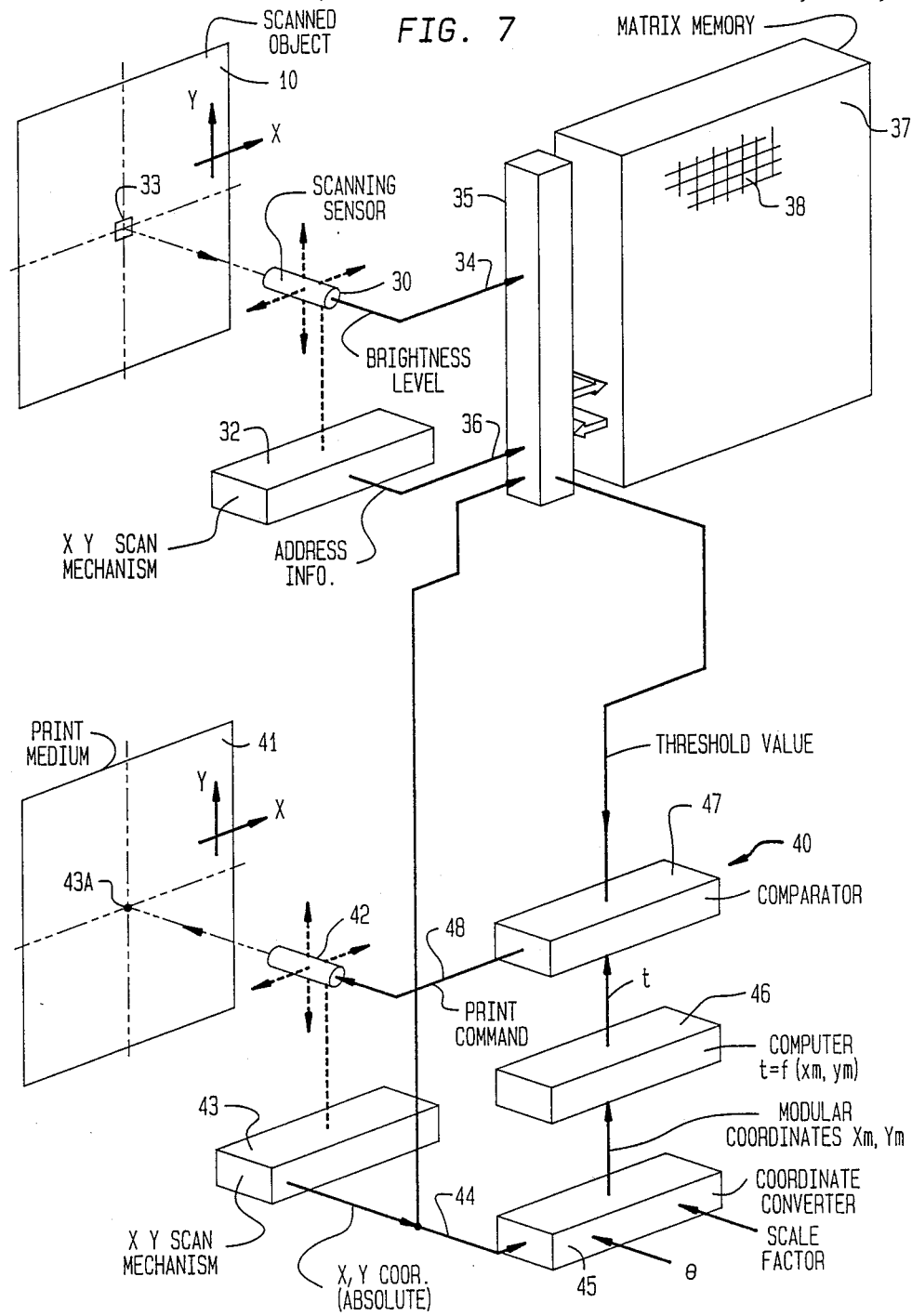
FIG. 7 is a schematic block diagram illustrating the manner in which an object matrix is obtained, and how the contents of this matrix is utilizes for the purpose of printing on a recording medium in accordance with the present invention.

FIG. 7 shows a simplified block diagram for obtaining an object matrix as a consequence of the scanning of an object, and for utilizing the contents of the object matrix for reproducing the object on a recording medium in accordance with the present invention. Object 10 having coordinate axes X, Y is scanned by sensor 30 which is capable of moving in the direction of each of the coordinate axes under control of scan mechanism 32. In a manner that is entirely conventional, mechanism 32 effects a raster scan of object 10. As shown in FIG. 7, sensor 30 has reached an intermediate stage of the raster scan of object 10 and receives light from elemental area 33 having coordinates x, y. The intensity of light from elemental area 33 is sensed by sensor 30 and converted into a signal which appears in line 34. A parameter of the signal such as its magnitude, for example, represents the brightness level of elemental area 33. The signal in line 34 is applied to computer 35 which also receives the coordinates of the sensor and applies this information via line 36 to the computer. The computer operates to store in matrix memory 37 information that represents the brightness level of elemental area 33. This is achieved by addressing a cell in memory, such as cells 38, and storing information in that cell in accordance with the brightness information derived by sensor 30. As a consequence of this conventional method of data acquisition, each cell in memory 37 is associated with a unique elemental area of object 10. That is to say, the address of a cell in memory 37 is functionally related to the coordinates of an elemental area in the object associated with the cell.

Apparatus 40 shown in FIG. 7 is in accordance with the present invention and produces a half-tone reproduction of object 10 on recording medium 41 using the contents of object matrix 37. Apparatus 40 comprises actuatable printhead 42 operatively associated with and displaceable relative to recording medium 41. Upon actuation of printhead 42, a dot is printed on recording medium 41 at point 43 determined by the coordinates of the printhead at the time the latter is actuated. Printhead 42 is preferably a laser, but for some medium, it could be an impact apparatus which physically engages the recording medium when the printhead is actuated. Alternatively, the printhead may be a thermal printhead, or any other type of conventional marking device. The medium can be paper, photographic film (which may then be used as a master for a conventional printing process), or any other suitable medium.

In a preferred embodiment of the invention, as might be required, for example, if the computation of the printhead actuation signal is relatively slow, the actuation signals are not immediately applied to the printheads, but are stored in the form of a bit map. During a subsequent printing operation, the bit map is used to effect actuation of the printhead.

For reference purposes, the position of printhead 42 relative to medium 41 defines what is termed herein exposure point 43. The term "exposure point" is intended to mean the physical location on medium 41 at which a dot may or may not be printed depending upon whether the printhead is actuated when the printhead is located at the exposure point.

Printhead 42 is movable in orthogonal directions as indicated by the arrows in FIG. 7 associated with the printhead under the control of scan mechanism 43. That is to say, scan mechanism 43 may be programmed to effect a raster scan of recording medium 41 by printhead 42. In a conventional manner, the coordinates of printhead 42 are produced by scan mechanism 43 and applied via line 44 to coordinate converter 45. The latter is schematically illustrated as a box but actually is part of a computer which receives the absolute coordinates of an exposure point and converts these coordinates to modular coordinates representative of the coordinates of the exposure point on a mesh of a fictitious half-tone screen associated with an object point and having a predetermined angular orientation relative to the object. This situation is illustrated in FIG. 5 in that, with knowlege of the angularity of the modular mesh of the fictitious screen, and the modulus of the screen, as determined by the pixel size of the object, the absolute coordinates of the exposure point can be converted into relative coordinates u,v associated with a single fictitious modular mesh at any preselected angle.

Computer 46 shown in FIG. 7 receives the modular coordinates u, v and calculates a threshold screen value from the modular coordinates in a manner described in detail below. The output of computer 46 is the threshold screen value t associated with a modular screen at a preselected angle. The threshold value is applied to comparator 47 which compares the threshold screen value so computed with the value of the contents of object matrix 37 at an address corresponding to the absolute coordinates of printhead 42 modified by any scale factor that relates object 10 to recording medium 41.

Comparator 47 produces a print command output at 48 in accordance with the results of the comparison between the gray level value extracted from object matrix 37 and threshold value t produced by computer 46. In one mode of operation, comparator 47 generates a print command when the gray level value extracted from memory 37 exceeds threshold value t. In another mode of operation, a print command is produced when the opposite situation occurs.

The print command appearing in line 48 is applied to printhead 42 and serves to actuate the same. Alternatively, the command can be stored in a bit map for later use. That is to say, in the normal mode of operation, a print command is generated by comparator 40 when the magnitude of the gray level extracted from memory 37 exceeds the threshold value t produced by computer 46. Under these conditions, printhead 42 is actuated for the purpose of printing a spot at exposure point 43A. When this process is completed, scan mechanism 43 moves printhead 42 to its next position and the procedures described above are repeated for the new exposure point.

Apparatus 40 is greatly simplified in the drawing to facilitate an explanation of the invention. Actually, printhead 42 may be one of many printheads moved simultaneously by scan mechanism 43 for the purpose of defining a plurality of exposure points at a given instant during the traverse of the various printheads relative to the recording medium. In such case, the actuation of the various printheads is achieved in parallel to reduce the time for producing an image on medium 41. For simplicity, the drawings show the mesh repeat being equal to the pixel size. In practice, this is seldom the case; and the mesh repeat can be larger or smaller, as well as being equal, to the pixel size.

In the preferred form of the invention, computer 46 computes a value for a particular analytical function. In one form of the invention, computer 46 solves the parametric equation:

$$u = (t) \cos(kt), \quad v = (t) \sin(kt) \tag{1}$$

where u and v are the modular coordinates of the exposure point, kt is the angle whose tangent is u/v, and t is the threshold screen value.

Eq. (1) is a parametric equation that defines a curve commonly referred to as the spiral of Archimedes. A point on this spiral has a value equal to the radial distance of the point to the origin. Thus, this curve provides threshold values that increase monotonically starting at the origin and moving outwardly. A curve representing this parametric equation is shown at 50 in FIG. 6 for the value $k=2.65\pi$. The spacing of the grid lines represent the normalized spacing of the exposure points, so that for the example shown in FIG. 6, sixty-four exposure points will be included in each mesh. It should be understood that the exposure points do not necessarily fall on the intersections of the grid, but may fall anywhere in the mesh. The exposure points, however, form a "grid" of points in the mesh spaced by the spacing of the grid lines. Thus, the parameter k can be seen to be normalized to the exposure point repeat pattern. For screen angles other than 0°, the grid of exposure points will be inclined to the grid of the mesh shown in the drawing.

Figure 6A:
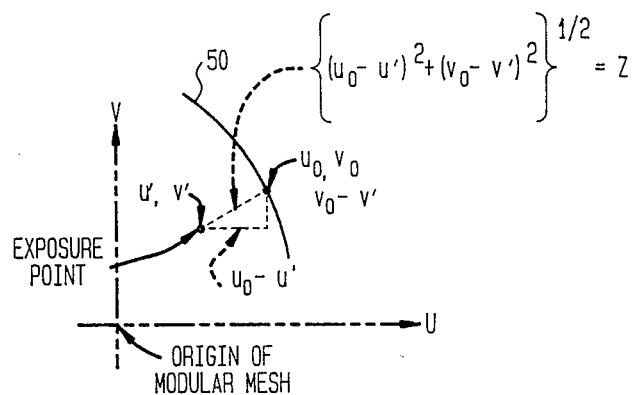
FIG. 6A illustrates an interpolation scheme for the embodiment of FIG. 6 for an exposure point displaced from the curve defined by the analytical function of the embodiment of FIG. 6.
Figure 6:
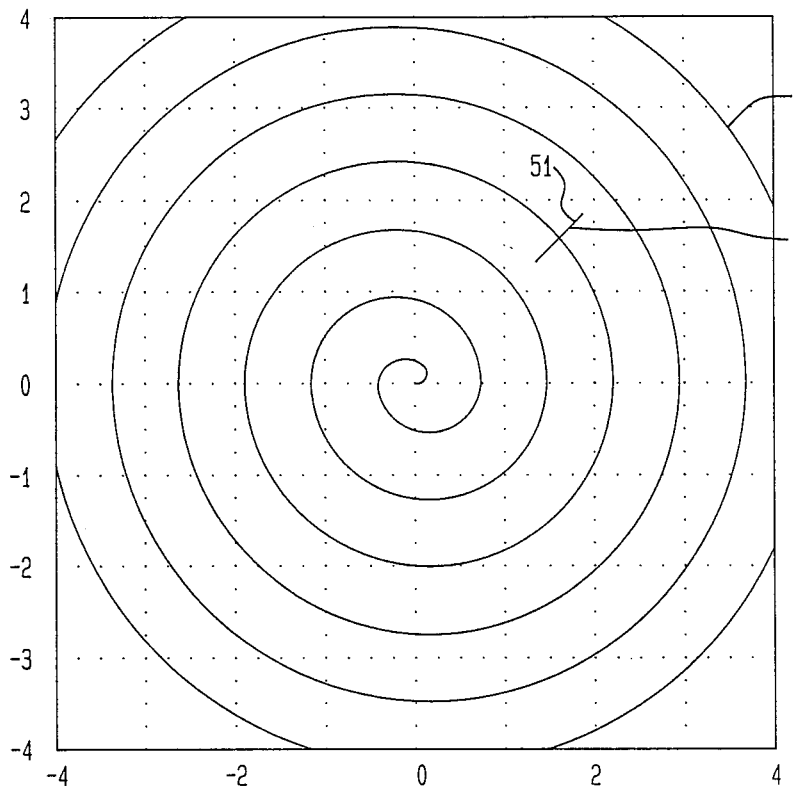
FIG. 6 shows one embodiment of the analytical function which represents a mesh of a fictitious screen.

The value of the threshold at a point 52 on the curve of FIG. 6 is defined as the radial distance of the point.

Because of the manner in which scan mechanism 43 drives printhead 42, only a few exposure points are likely to fall on curve 50 as shown in FIG. 6. In order to account for this situation, an association process must be employed. A suitable association process is shown in FIG. 6A wherein an exposure point at coordinates u',v' is displaced from curve 50. The criteria for determining the value of the function t that is to be associated with an exposure point at u',v' is based on minimizing the distance from the exposure point to curve 50. Point $u_o,v_o$ on curve 50 will be the point closest to actual exposure point u',v' when the value z, the distance of $u_o,v_o$ to the point u',v' is minimized. It is the value of t at the point $u_o,v_o$ closest to the point u',v' that constitutes the threshold value associated with the exposure point at u',v'.

As shown in FIG. 6A, the distance z is the hypotenuse defined by the difference between the ordinate and abscissa coordinates of the exposure point and the point $u_o,v_o$ on curve 50. The value of z can be minimized in a conventional manner by an iterative process to identify $u_o,v_o$. Line 51 represents the locus of points which all have the same threshold value. That is, any exposure point lying on line 51 will have a threshold value equal to the radius of the point where line 51 crosses the spiral. If k is greater than $2\pi$, than the length of this line will be less than the spacing of the exposure points, and no two exposure points in a mesh can have the same value of threshold. Thus, this arrangement assures that each exposure point within any mesh has a unique threshold value different from the value for any other exposure point in that mesh.

It is a feature of this method of determining threshold values that the exact shape of the dots for each threshold value will vary slightly depending on the exact juxtaposition of the exposure points on the mesh. Furthermore, the gray level value which results in printing a given number of spots will also vary slightly depending on the juxtaposition of the exposure points on the mesh. This variation serves to reduce artifactual contours which sometimes occur using other methods to print areas of the image in which the gray level slowly changes. Additionally, the relationship between the number of cells printed and the gray level on the object, may no longer be a linear one such as that shown in FIG. 3. This can be corrected by a suitable adjustment to the values in the object (image) matrix.

Figure 8:
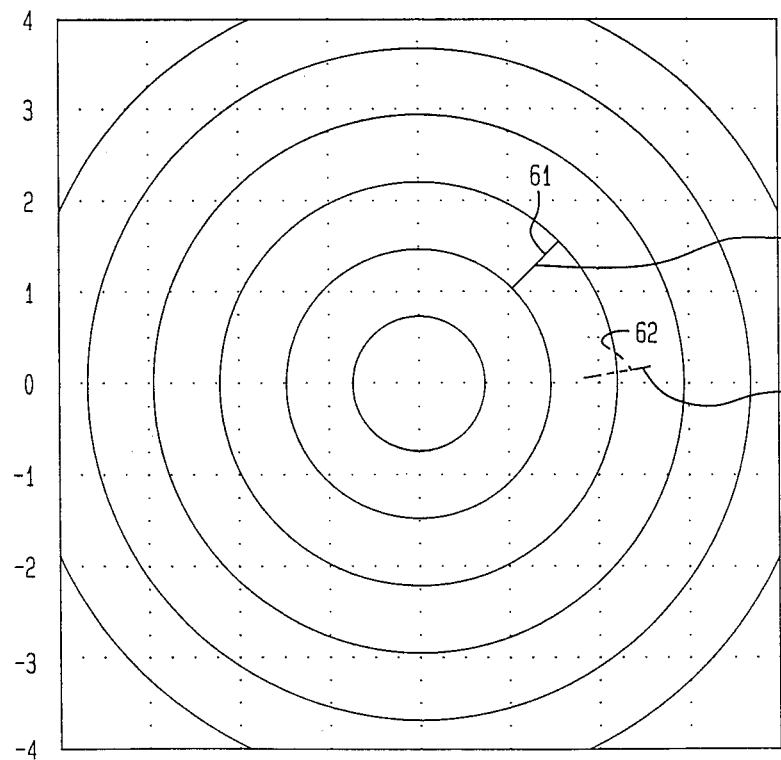
FIG. 8 shows a second embodiment of an analytical function according to the present invention.

In a second embodiment of the invention, the analytical function of threshold screen values produces a series of concentric circles as shown in FIG. 8. The circles have radii $0, S \ldots (n)(S)$ where n is the index and s is a constant. In the example illustrated in FIG. 8, the mesh contains sixty-four exposure points in an $8 \times 8$ grid. The threshold screen value for an exposure point u,v is Val-(u,v) where:

$$\text{Val}(u,v) = (S)\text{floor}\{(u^2+v^2)^{\frac{1}{2}}/S\} + (S)\{a \tan (u,v)/2\pi\} \tag{2}$$

where "floor" is the next lowest integer below the value of the argument, and a tan is the positive angle from the positive abscissa whose tangent is u/v. The value of S depends on the number of cells in the mesh.

The function shown in Eq. (2) is a constant on the solid radial line segment 61 shown in FIG. 8. This constant, namely Val(u,v) is equal to the value of the radius of the next inner circle plus a factor equal to S times a complete rotation of the point about the origin. Thus, the region between the first and second rings will have values from S at 0° on the abscissa) to 2(S) at 360°. Values of the threshold in the next ring will vary from 2(S) at 0° to 3(S) at 360°. In order to preserve the feature that each exposure point in a given mesh should have a different threshold value, the value of S should be less than unity, and preferably between 0.6 and 0.8, with the best results being when $S=0.73$. Finally, normalization in this embodiment, as in the case of the other embodiments is to the exposure point spacing.

In a third embodiment of the invention, the threshold screen value at an exposure point u,v is Val(u,v) where:

$$\text{Val}(u,v) = (S)\text{round}\{(u^2+v^2)^{\frac{1}{2}}/S\} + (S)\{a \tan (u,v)/2\pi\} \tag{3}$$

where S is a constant in the same range of preferred and best values as the second embodiment, "round" means to round the argument to the nearest integer, and the other variables have the same meaning as in the previous embodiments. This function is a constant on the dashed line segment 62.

In a fourth embodiment of the invention, the threshold screen function at an exposure point u,v is Val(u,v) where:

$$\text{Val}(u,v) = (S)\text{round}\{[\text{abs}(u)+\text{abs}(v)]/S\} + (S)\{a \tan (u,v)/2\pi\} \tag{4}$$

where S is a constant, "round" means to round the argument to the nearest integer, abs(u) is the absolute value of u, abs(v) is the absolute value of v, a tan (u,v) is the angle whose tangent is u/v.

The embodiments of the invention have been illustrated with a mesh size that incorporates $8 \times 8$ exposure points. However, the present invention is applicable to a greater or smaller number of exposure points, and to both odd or even numbers of exposure points.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for producing a half-tone reproduction of an image using gray level values associated with object points having object coordinates relates to the image, said method utilizing a marking device displaceable relative to a recording medium, and constructed and arranged to mark a spot on the medium at an exposure point determined by the marking device coordinates in response to actuation of the marking device, said method comprising the steps of:
    (a) establishing a relationship between the object coordinates and the marking device coordinates;
    (b) positioning said marking device relative to said medium and evaluating the coordinates of the marking device at its position for establishing an exposure point on the medium;
    (c) converting the evaluated coordinates to modular coordinates representative of the coordinates of the exposure point on a mesh of a fictitious half-tone screen associated with the object point;
    (d) computing a threshold screen value from the modular coordinates;
    (e) comparing the computed threshold screen value to the gray level value of an object point whose coordinates are related to said exposure point;
    (f) actuating said marking device in accordance with the results of the comparison; and
    (g) repeating steps (a)–(f) until the reproduction is complete.

2. A method according to claim 1 wherein the computing step utilizes a threshold screen value function that is an analytical function of the modular coordinates.

3. A method according to claim 2 wherein said threshold screen value is based on an analytical function of the form:

$$u = (t)\cos(kt), \quad v = (t)\sin(kt)$$

where u and v are the transformed coordinates of the exposure point, k is a constant, and t is the threshold screen value.

4. A method according to claim 3 wherein k is greater than $2\pi$.

5. A method according to claim 3 wherein k is in the range of about $2.5\pi$ to $2.8\pi$.

6. A method according to claim 3 wherein k is about $2.65\pi$.

7. A method according to claim 3 wherein the threshold screen value for an exposure point having coordinates u',v' not lying on the curve represented by $u=(t)\cos(kt)$, $v=(t)\sin(kt)$ is determined by the point on the curve at which the distance of the exposure point u, v to the curve is a minimum.

8. A method according to claim 2 wherein Val(u,v) is the threshold screen value at an exposure point u, v where $$\text{Val}(u,v) = (S)\text{floor}\{(u^2+v^2)^{\frac{1}{2}}/S\} + (S)\{a\tan(u,v)/2\pi\}$$

where S is a constant, "floor" is the next lowest integer below the value of the argument, and a tan (u,v) is an angle associated with (u,v).

9. A method according to claim 7 wherein S is less than about 1.

10. A method according to claim 7 wherein S is in the range 0.7 to 0.8.

11. A method according to claim 7 wherein S is about 0.73.

12. The method according to claim 2 wherein Val(u,v) is the threshold screen value at an exposure point u,v where $$\text{Val}(u,v) = (S)\text{round}\{(u^2+v^2)^{\frac{1}{2}}/S\} + (S)\{a\tan(u,v)/2\pi\}$$

where S is a constant, "round" means to round the argument to the nearest integer, and a tan (u,v) is an angle associated with (u,v).

13. The method of claim 12 wherein S is less than about 1.

14. A method according to claim 12 wherein S is in the range 0.7 to 0.8.

15. A method according to claim 12 wherein S is about 0.73.

16. A method according to claim 2 wherein Val(u,v) is the threshold screen value and exposure point u,v where $$\text{Val}(u,v) = (S)\text{round}\{[\text{abs}(u)+\text{abs}(v)]/S\} + (S)\{a\tan(u,v)/2\pi\}$$

where S is a constant, "round" means to round the argument to the nearest integer, abs(u) is the absolute value of u, abs(v) is the absolute value of v, and a tan (u,v) is an angle associated with (u,v).

17. Apparatus for producing a half-tone reproduction of an image on a recording medium using gray level values associated with object points having object coordinates related to the image, said apparatus comprising:
    (a) an actuatable marking device operatively associated with and displaceable relative to said medium for marking a spot on the medium at an exposure point determined by the coordinates of the marking device at which the latter is actuated;
    (b) means for displacing said marking device relative to said medium;
    (c) means responsive to the location of said marking device relative to said medium for producing a representation of the coordinates of the marking device;
    (d) means for converting the representation of the coordinates of the marking device to modular coordinates representative of the coordinates of the exposure point on a mesh of a fictitious half-tone screen having a predetermined angular orientation relative to said object;
    (e) means for computing a threshold screen value from the modular coordinates;
    (f) means for obtaining the gray level value of an object point whose coordinates are related to said exposure point;
    (g) a comparator for comparing the obtained gray level value with said threshold screen value and producing an actuating signal depending upon the results of the comparison; and
    (h) means for applying said actuating signal to said marking device for selectively actuating the same.

18. Apparatus according to claim 17 wherein said threshold screen value is computed from an analytical function of the modular coordinates.

19. Apparatus according to claim 18 wherein said threshold screen value is based on a function:

$$u=(t)\cos(kt), v=(t)\sin(kt)$$

where u and v are the modular coordinates of the exposure point, k is a constant, and t is the threshold screen value.

20. Apparatus according to claim 19 wherein k is greater than about $2\pi$.

21. Apparatus according to claim 19 wherein k is in the range of about $2.5\pi$ to $2.9\pi$.

22. Apparatus according to claim 19 wherein k is about $2.65\pi$.

23. Apparatus according to claim 19 wherein the threshold screen value for an exposure point having coordinates u', v' not lying on the curve represented by $u=(t)\cos(kt), v=(t)\sin(kt)$ is determined by the point on the curve at which the distance of the exposure point u, v to the curve is a minimum.

24. Apparatus according to claim 16 wherein Val (u,v) is the threshold screen value at an exposure point (u,v) where $$Val(u,v)=(S)floor\{(u^2+v^2)^{\frac{1}{2}}/S\}+(S)\{a\tan(u,v)/2\pi\}$$

where S is a constant, "floor" is the next lowest integer below the value of the argument, and a tan (u,v) is an angle associated with (u,v).

25. Apparatus according to claim 23 wherein S is less than about 1.

26. Apparatus according to claim 23 wherein S is in the range of about 0.7 to 0.8.

27. Apparatus according to claim 23 wherein S is about 0.73.

28. Apparatus according to claim 18 wherein Val (u,v) is the threshold screen value at an exposure point u, v where $$Val(u,v)=(S)floor\{(u^2+v^2)^{\frac{1}{2}}/S\}+(S)\{a\tan(u,v)/2\pi\}$$

where S is a constant, "floor" is the next lowest integer below the value of the argument, and a tan (u,v) is an angle associated with (u,v).

29. Apparatus according to claim 28 wherein S is less than about 1.

30. Apparatus according to claim 28 wherein S is in the range 0.7 to 0.8.

31. Apparatus according to claim 28 wherein S is about 0.73.

32. A method according to claim 3 wherein the exposure points are spaced a distance apart, and wherein the threshold screen value for an exposure point having coordinates (u',v') not lying on the curve represented by $u=(t)\cos(kt), v=(t)\sin(kt)$ is determined by the value of a point on the curve which is less than half the spacing between said exposure points.

33. A method for producing a half-tone reproduction of an image using gray level values associated with object points having object coordinates related to the image, said method utilizing a marking device displaceable relative to a recording medium, and constructed and arranged to mark a spot on the medium at an exposure point determined by the marking device coordinates in response to actuation of the marking device, said method comprising the steps of:
  (a) establishing a relationship between the object coordinates and the marking device coordinates;
  (b) positioning said marking device relative to said medium and evaluating the coordinates of the marking device at its position for establishing an exposure point on the medium;
  (c) converting the evaluated coordinates to modular coordinates representative of the coordinates of the exposure point on a mesh of a fictitious half-tone screen associated with the object point;
  (d) deriving a threshold screen value from an analytic function of the coordinates which gives a different threshold value for each exposure point within a given mesh;
  (e) comparing the derived threshold screen value to the gray level value of an object point whose coordinates are related to said exposure point;
  (f) actuating said marking device in accordance with the results of the comparison; and
  (g) repeating steps (a)–(f) until the reproduction is complete.

* * * * *

UNITED STATES PATENT AND TRADEMARK OFFICE
CERTIFICATE OF CORRECTION

PATENT NO. : 4,912,562

DATED : Mar. 27, 1990

INVENTOR(S) : P. Fenster et al

It is certified that error appears in the above-identified patent and that said Letters Patent is hereby corrected as shown below:

Col. 12, line 4, change "7" to ---8---.
Col. 12, line 6, change "7" to ---8---.
Col. 12, line 8, change "7" to ---8---.
Col. 13, line 35, change "23" to ---24---.
Col. 13, line 37, change "23" to ---24---.
Col. 13, line 39, change "23" to ---24---.

Signed and Sealed this

Eighth Day of September, 1992

Attest:

DOUGLAS B. COMER

*Attesting Officer*   Acting Commissioner of Patents and Trademarks